United States Patent
Sato et al.

(10) Patent No.: US 10,566,142 B2
(45) Date of Patent: Feb. 18, 2020

(54) SOLID ELECTROLYTIC CAPACITOR AND METHOD FOR MANUFACTURING SOLID ELECTROLYTIC CAPACITOR

(71) Applicant: Nippon Chemi-Con Corporation, Shinagawa-ku, Tokyo (JP)

(72) Inventors: Kenta Sato, Tokyo (JP); Masao Sakakura, Tokyo (JP); Kazuya Koseki, Tokyo (JP)

(73) Assignee: Nippon Chemi-Con Corporation, Tokyo (JP)

( * ) Notice: Subject to any disclaimer, the term of this patent is extended or adjusted under 35 U.S.C. 154(b) by 0 days.

(21) Appl. No.: 15/746,855

(22) PCT Filed: Aug. 5, 2016

(86) PCT No.: PCT/JP2016/073037
§ 371 (c)(1),
(2) Date: Jan. 23, 2018

(87) PCT Pub. No.: WO2017/026378
PCT Pub. Date: Feb. 16, 2017

(65) Prior Publication Data
US 2018/0218844 A1     Aug. 2, 2018

(30) Foreign Application Priority Data
Aug. 12, 2015   (JP) ................... 2015-159562

(51) Int. Cl.
*H01G 9/028*   (2006.01)
*H01G 9/15*    (2006.01)
(Continued)

(52) U.S. Cl.
CPC .......... *H01G 9/151* (2013.01); *H01G 9/0036* (2013.01); *H01G 9/02* (2013.01); *H01G 9/028* (2013.01); *H01G 9/048* (2013.01)

(58) Field of Classification Search
CPC .......... H01G 9/02; H01G 9/035; H01G 9/028; H01G 9/045; H01G 9/048; H01G 9/15; H01G 9/0036; H01G 9/151; H01G 8/028
See application file for complete search history.

(56) References Cited

U.S. PATENT DOCUMENTS

| | | | |
|---|---|---|---|
| 4,910,645 A | 3/1990 | Jonas et al. | |
| 2005/0094352 A1* | 5/2005 | Komatsu | H01G 9/022 361/504 |

(Continued)

FOREIGN PATENT DOCUMENTS

| | | |
|---|---|---|
| JP | H02-015611 A | 1/1990 |
| JP | H04-337618 A | 11/1992 |

(Continued)

OTHER PUBLICATIONS

International Search Report from International Patent Application No. PCT/JP2016/073037, dated Oct. 18, 2016.
(Continued)

*Primary Examiner* — Nguyen T Ha
(74) *Attorney, Agent, or Firm* — Shapiro, Gabor and Rosenberger, PLLC

(57) ABSTRACT

A solid electrolytic capacitor which exhibits excellent characteristics for high voltage applications of 80 WV or more and a method for manufacturing this solid electrolytic capacitor are provided. This solid electrolytic capacitor includes a capacitor element 10 which is obtained by winding an anode foil 1 and a cathode foil 2, with a separator 3 interposed therebetween, the capacitor element 10 includes a solid electrolyte layer, and a void part in the capacitor element 10 is filled with an electrolyte solution, the electrolyte solution contains an ammonium salt of an aliphatic carboxylic acid as a solute and a polyhydric alcohol as a
(Continued)

solvent, and the addition amount of the acid serving as the solute relative to the solvent is 0.6 mol/kg or less.

9 Claims, 1 Drawing Sheet

(51) Int. Cl.
  *H01G 9/00* (2006.01)
  *H01G 9/02* (2006.01)
  *H01G 9/048* (2006.01)

(56) References Cited

U.S. PATENT DOCUMENTS

| | | | | |
|---|---|---|---|---|
| 2006/0047030 A1* | 3/2006 | Yoshida | ............... | C08K 5/34 524/99 |
| 2006/0217933 A1* | 9/2006 | Holi | ............... | B23P 19/04 702/187 |
| 2007/0064376 A1* | 3/2007 | Merker | ............... | H01G 9/0032 361/528 |
| 2007/0121276 A1* | 5/2007 | Uzawa | ............... | H01G 9/035 361/503 |
| 2009/0023001 A1* | 1/2009 | Mizutani | ............... | C25D 11/02 428/469 |
| 2011/0080690 A1* | 4/2011 | Ning | ............... | H01G 9/028 361/525 |
| 2012/0026645 A1* | 2/2012 | Sakakura | ............... | H01G 9/035 361/505 |
| 2012/0154985 A1* | 6/2012 | Kato | ............... | H01G 9/02 361/523 |
| 2014/0009869 A1* | 1/2014 | Aoyama | ............... | H01G 9/0036 361/504 |
| 2014/0205916 A1* | 7/2014 | Garcia-Juan | ............... | C01B 25/455 429/403 |
| 2015/0287540 A1 | 10/2015 | Koseki et al. | | |

FOREIGN PATENT DOCUMENTS

| | | |
|---|---|---|
| JP | 2000-138136 A | 5/2000 |
| JP | 2004-214473 A | 7/2004 |
| JP | 2013-102004 A | 5/2013 |
| JP | 2013-153149 A | 8/2013 |
| JP | 2014-072465 A | 4/2014 |
| JP | 2014-123685 A | 7/2014 |

OTHER PUBLICATIONS

Extended European Search Report dated Feb. 26, 2019, in European Patent Application No. 16835075.9.

Office Action dated Sep. 17, 2019, in Japanese Patent Application No. 2015-159562.

* cited by examiner

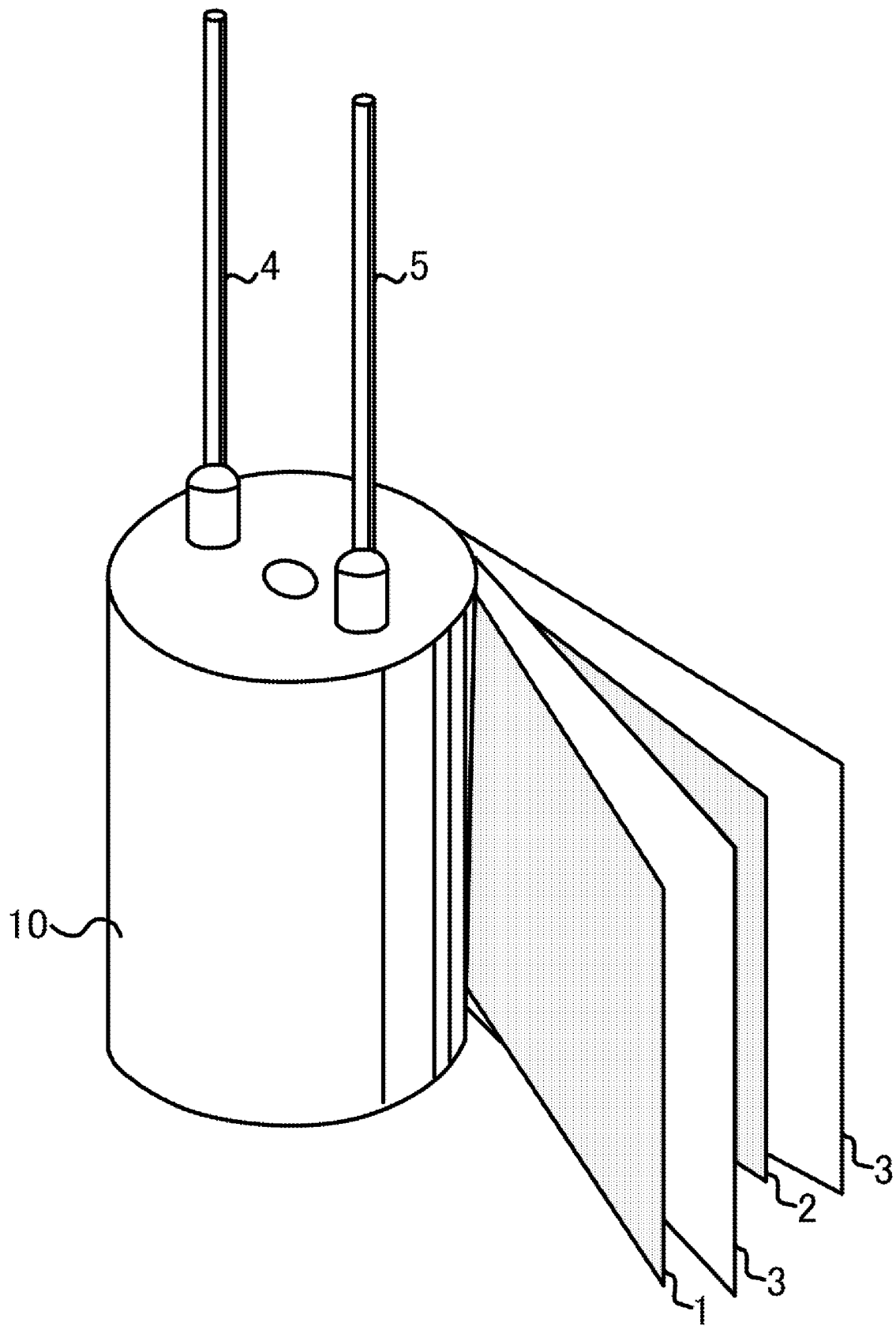

SOLID ELECTROLYTIC CAPACITOR AND METHOD FOR MANUFACTURING SOLID ELECTROLYTIC CAPACITOR

TECHNICAL FIELD

The present invention relates to a solid electrolytic capacitor and a manufacturing method for the solid electrolytic capacitor, and particularly relates to a solid electrolytic capacitor which is suitable for high voltage applications of 80 WV or more and a manufacturing method of the same.

BACKGROUND ART

In recent years, small-sizing and capacity expansion of solid electrolytic capacitors which are used for supplying power to digital electronic devices have been strongly demanded. Solid electrolytic capacitors using a metal, such as aluminum, having a valve action are generally widely used, because large capacities can be obtained with small sizes by forming the valve action metal serving as an anode foil into, for example, an etching foil to enlarge a surface of a dielectric.

A solid electrolytic capacitor for applications of small-sizing and large capacity generally has a capacitor element formed by winding an anode foil and a cathode foil, which are formed of a valve-action metal such as aluminum, with a separator interposed therebetween. The solid electrolytic capacitor has a structure in which the capacitor element is impregnated by an electrolyte solution for driving, and housed in a metallic case made of aluminum or a synthetic resin case, and the case is sealed. Note that, not only aluminum but also tantalum, niobium, titanium, and the like are used as anode materials, and the same kinds of metals as the anode materials are used as cathode materials.

In addition, as a solid electrolyte to be used for a solid electrolytic capacitor, manganese dioxide and a 7,7,8,8,-tetracyanoquinodimethane (TCNQ) complex are known, however, recently, there is a technology (Patent Literature 1) focusing on a conductive polymer, such as polyethylenedioxythiophene (which will be referred to as PEDOT below), that has a mild reaction speed and is excellent in adhesion to an oxide coating layer of an anode foil.

CITATION LIST

Patent Literature

[Patent Literature 1]
Japanese Unexamined Patent Application, Publication No. H2-15611

SUMMARY OF INVENTION

Technical Problem

However, as solid electrolytic capacitors for vehicles and general power source circuits, capacitors for low voltage applications of about 25 WV or 63 WV are used. In recent years, however, a solid electrolytic capacitor having excellent ESR characteristics at high temperatures to be used for high voltage applications of 80 WV or more has been desired.

The present invention has been proposed to solve the above-described problem, and the objective is to provide a solid electrolytic capacitor with excellent characteristics for high voltage applications of 80 WV or more, and a method for manufacturing of the same.

Solution to Problem

In order to solve the above-described problem, the inventors performed investigation in various perspectives, and as a result, discovered that an excellent ESR characteristic can be obtained by using an aliphatic carboxylic acid as a solute of an electrolyte solution filling a capacitor element in a high voltage region exceeding 80 WV, and finally achieved this invention based on the knowledge.

In other words, a solid electrolytic capacitor of the present invention has a capacitor element obtained by winding an anode foil and a cathode foil with a separator interposed therebetween, the capacitor element has a solid electrolyte layer, a void part of the capacitor element is filled with an electrolyte solution, the electrolyte solution contains an ammonium salt of an aliphatic carboxylic acid as a solute and a polyhydric alcohol as a solvent, and an addition amount of an acid serving as the solute relative to the solvent is 0.6 mol/kg or less.

The polyhydric alcohol may be ethylene glycol. The electrolyte solution may be a non-aqueous electrolyte solution that does not contain water as the solvent. The electrolyte solution may further contain boric acid and mannitol. A molecular weight of the aliphatic carboxylic acid may be 150 or more.

In addition, a method for manufacturing the above-described solid electrolytic capacitor is also an aspect of the invention.

Advantageous Effects of Invention

According to the invention, a solid electrolytic capacitor that exhibits excellent characteristics for high voltage applications of 80 WV or more, and a method for manufacturing the solid electrolytic capacitor may be provided.

BRIEF DESCRIPTION OF DRAWINGS

FIG. 1 is a perspective diagram showing an example of a configuration of a solid electrolytic capacitor according to a first embodiment.

DESCRIPTION OF EMBODIMENTS

[1. Configuration]

A solid electrolytic capacitor according to an embodiment will be described in detail with reference to FIG. 1. As shown in FIG. 1, the solid electrolytic capacitor has a capacitor element 10 which is formed by winding an anode foil 1 and a cathode foil 2 with separators 3 interposed therebetween. The solid electrolytic capacitor is produced by housing the capacitor element 10 and an electrolyte solution in an unillustrated cylindrical outer case with bottom, and sealing the case.

The anode foil 1 includes a valve metal foil having a dielectric film on its surface. As the valve metal foil, aluminum, tantalum, niobium, titanium, or the like can be used. The surface of the valve metal foil may have a surface area enlarged by performing electro-chemical etching in a chloride aqueous solution to rough the surface. In addition, the dielectric film may be formed by performing chemical conversion treatment using, for example, ammonium oxide, ammonium borate, or the like. The cathode foil 2 is composed of the valve metal foil similar to the anode foil 1. The cathode foil may also have a surface that is roughened by etching. In addition, a thin dielectric film (for about 1 to 10 V) may be formed on the cathode foil 2 using chemical conversion treatment if necessary. Hereinbelow, the anode foil 1 and the cathode foil 2 may be collectively referred to as electrode foils. Dimensions of the electrode foils can be arbitrarily set in accordance with the specifications of a solid electrolytic capacitor to be produced.

As illustrated in FIG. 1, the anode foil 1 and the cathode foil 2 are connected to lead wires 4 and 5, which connects the respective electrodes to the outside, using, for example, stitching, ultrasonic welding, or the like. The lead wires 4 and 5 are formed of aluminum or the like. The lead wires 4 and 5 are electrode lead-out means to electrically connect the anode foil 1 and the cathode foil 2 to the outside, and are drawn out from an end surface of the wound capacitor element.

As the separators 3, a non-woven fabric made of mainly a synthetic fiber, or glass fiber can be used. As the synthetic fiber, a polyester fiber, a nylon fiber, a rayon fiber, or the like can be used, and these fibers may be used alone or in combination. In addition, separators made of a natural fiber can also be used. The separators 3 may have a width dimension slightly greater than the anode foil 1 and the cathode foil 2.

The capacitor element 10 formed as described above may undergo a repair chemical conversion. When mechanical stress is loaded on the wound electrode foils at the time of winding the capacitor element, damage such as cracking or the like may occur to the dielectric film. In a repair chemical conversion, by performing the chemical conversion by immersing the capacitor element 10 in a chemical conversion treatment solution, the dielectric film may be formed in the portion which cracking has occurred, repairing the damage. As the chemical conversion treatment solution, a phosphoric acid-based chemical conversion treatment solution such as ammonium dihydrogen phosphate or diammonium hydrogen phosphate, a boric acid-based chemical conversion treatment solution such as ammonium borate, or an adipic acid-based chemical conversion treatment solution such as ammonium adipate may be used. Among these, ammonium dihydrogen phosphate is particularly preferably used.

The capacitor element 10 has a solid electrolyte layer formed thereon. Specifically, the solid electrolyte layer is formed on the separators 3 and the electrode foils. The solid electrolyte layer can be formed by immersing the capacitor element 10 in a conductive polymer dispersion and then drying the capacitor element. The process of immersion in the conductive polymer dispersion and drying may be repeated multiple times. The conductive polymer dispersion is a solution which particles of a conductive polymer are dispersed in a solvent. As a conductive polymer, for example, PEDOT powder can be used. In addition, the solvent may contain a solid of polystyrene sulfonate as a dopant.

The solvent of the conductive polymer dispersion may be any solvent as long as particles or a powder of the conductive polymer is dissolved, and water is mainly used. However, ethylene glycol may be used as the solvent of the dispersion alone or in combination if necessary. It has been ascertained that, when ethylene glycol is used as a solvent of the dispersion, ESR among electrical characteristics of a product can be particularly reduced. Note that, in order to improve an impregnating property and conductivity of the conductive polymer dispersion, various additives may be added to the conductive polymer dispersion, and the neutralization by adding cations may be performed. In particular, when sorbitol, or sorbitol and polyhydric alcohol are used as additives, ESR decreases, and the deterioration in a voltage withstanding characteristic caused by lead-free reflow or the like can be prevented.

In addition, a concentration of the conductive polymer may be set to 1 to 10 wt % with respect to an aqueous solution. The particles of the conductive polymer may include primary particles of the conductive polymer, an agglomerate which a conductive polymer compound and a dopant are agglomerate (secondary particles), and powder of the primary particles and secondary particles.

Specifically, as the conductive polymer, a mixture of particles of thiophene or a derivative thereof and a solid of a dopant composed of a polymeric sulfonic acid may be preferably used. The conductive polymer dispersion can be obtained by performing oxidative polymerization on thiophene that is a polymerizable monomer, or a derivative thereof in the presence of a polymeric sulfonic acid serving as a dopant in water or an aqueous solution. As thiophene that is a conductive polymer, or a thiophene derivative that is a derivative thereof, for example, 3,4-ethylenedioxythiophene, 3-alkylthiophene, 3-alkoxythiophene, 3-alkyl-4-alkoxythiophene, 3,4-alkylthiophene, 3,4-alkoxythiophene, and the like can be exemplified. Suitable numbers of carbon atoms of an alkyl group or an alkoxy group are 1 to 16, and 3,4-ethylenedioxythiophene is particularly preferable. In addition, it is limited to thiophene, and pyrrole or a derivative thereof may be used. As particularly preferable conductive polymers obtained from these polymerizable monomers, polythiophene, polyethylenedioxythiophene, and polypyrrole can be exemplified.

The capacitor element 10 in which the solid electrolyte layer has been formed is immersed in an electrolyte solution, and the electrolyte solution is filled in a void part of the capacitor element 10. When the capacitor element 10 is filled with the electrolyte solution, a filled amount is arbitrary as long as the void parts of the capacitor element 10 are filled, and is preferably 3 to 100% of the void parts of the capacitor element 10.

A non-aqueous electrolyte solution that does not contain water as a solvent may be used as the electrolyte solution of the embodiment. In this specification, a non-aqueous electrolyte solution is an electrolyte solution which no water is added when the electrolyte solution is produced. When the non-aqueous electrolyte solution is used, an increase in ESR can be suppressed more than when an aqueous electrolyte solution containing water is used as a solvent. However, although moisture included in the air or the separators may be incorporated into the solid electrolytic capacitor in the process of manufacturing, if an amount of moisture included in the solid electrolytic capacitor can be maintained to 3 wt % or lower, there is no concern of ESR increasing.

As a solvent that can be used for the electrolyte solution, a solvent having a boiling point of 120° C. or higher is preferably used, because it makes volatilization of the electrolyte solution difficult. As examples of the solvent, polyhydric alcohols such as γ-butyrolactone and ethylene glycol, sulfolane, dimethylformamide, and the like can be exemplified. As polyhydric alcohols, polyhydric alcohols having low molecular weights such as ethylene glycol, diethylene glycol, dipropylene glycol, 1,2-propanediol, glycerine, 1,3-propanediol, 1,3-butanediol, 2-methyl-2,4-pentanediol, and the like are preferable. In particular, when a solvent containing ethylene glycol is used, an initial ESR characteristic becomes favorable and high-temperature characteristics become favorable as well. In addition, an addition amount of ethylene glycol contained in a mixed solvent is preferably 5 wt % or higher, more preferably 40 wt % or higher, and most preferably 60 wt % or higher.

In addition, by adding a predetermined amount of γ-butyrolactone as a solvent, the impregnating property of the electrolyte solution to the capacitor element 10 can be improved. Use of ethylene glycol having a relatively high degree of viscosity and γ-butyrolactone having a low degree of viscosity may enhance the impregnating property of the electrolyte solution to the capacitor element 10. Therefore, charge/discharge characteristics at low temperatures become excellent, in addition to maintaining the initial characteristic and excellent characteristics of the capacitor element in long-term use. An addition amount of γ-butyrolactone in a mixed solvent is preferably 40 wt % or lower.

Furthermore, at least one solvent selected from sulfolane, 3-methylsulfolane, and 2,4-dimethylsulfolane may be additionally used as the ethylene glycol solvent of an ion conductive substance. Since these sulfolane-based solvents have high boiling points, the volatilization of the electrolyte solution is suppressed and excellent high-temperature characteristics becomes excellent. An addition amount of the sulfolane-based solvents in a mixed solvent is preferably 40 wt % or lower.

Solutes of the electrolyte solution include an ammonium salt of an aliphatic carboxylic acid. Using an ammonium salt of the aliphatic carboxylic acid is favorable for improving a voltage withstanding characteristic. As the aliphatic carboxylic acid, an aliphatic dicarboxylic acid such as an azelaic acid, an adipic acid, 1,6-decane dicarboxylic acid, 1,7-octane dicarboxylic acid, 7-methyl-7-methoxycarbonyl-1,9-decane dicarboxylic acid, 7,9-dimethyl-7,9-dimethoxycarbonyl-1,11-dodecanedicarboxylic acid, or 7,8-dimethyl-7,8-dimethoxycarbonyl-1,14-tetradecanedicarboxylic acid, aliphatic monocarboxylic acid, or an aliphatic polycarboxylic acid such as aliphatic tricarboxylic acid may be used. The above-described aliphatic carboxylic acids may be used alone or in a mixture. In addition, the aliphatic carboxylic acid having a molecular weight of 150 or more may be preferably used. When the aliphatic carboxylic acid have higher molecular weight, the voltage withstand characteristic of the solid electrolytic capacitor is more improved. In addition, although a substance other than the ammonium salt of the aliphatic carboxylic acid may be used for the solute, it is preferable to use the ammonium salt of the aliphatic carboxylic acid as a main solute. Here, a main solute refers to a substance accounting for 50 wt % or more of a whole solute.

With regard to the electrolyte solution, as is obvious from results of examples which will be described below, an addition amount of an acid serving as a solute relative to a solvent is preferably 0.6 mol/kg or less. By setting the addition amount of the acid serving as the solute relative to the solvent to 0.6 mol/kg or less, a change in an electrostatic capacity and ESR in tolerance tests at a high voltage of 80 WV or more can be suppressed.

Furthermore, as an additive of the electrolyte solution, polyoxy ethylene glycol, a complex compound of boric acid and a polysaccharide (mannitol, sorbitol, etc.), a complex compound of boric acid and a polyhydric alcohol, a nitro compound (o-nitrobenzoic acid, m-nitrobenzoic acid, p-nitrobenzoic acid, o-nitrophenol, m-nitrophenol, p-nitrophenol, etc.), a phosphate ester, or the like may be exemplified. In particular, addition of boric acid and mannitol among these may further suppress a change in an electrostatic capacity or ESR in tolerance tests.

[2. Method for Manufacturing a Solid Electrolytic Capacitor]

A method for manufacturing the above-described solid electrolytic capacitor of the embodiment includes the following steps.

(1) Step of forming a capacitor element
(2) Step of forming a solid electrolyte layer on the capacitor element
(3) Step of filling an electrolyte solution in a void part of the capacitor element
(4) Step of forming a solid electrolytic capacitor Each of the processes will be described below in detail.

(1) Step of Forming a Capacitor Element

In the step of forming the capacitor element 10, the capacitor element 10 is formed by winding the anode foil 1 and the cathode foil 2 with the separators 3 interposed therebetween. The anode foil 1 is formed of an etching foil obtained by, for example, performing etching process on a plate-shape valve-action metal foil such as aluminum or the like, and then forming a dielectric film thereon through a chemical conversion process. The cathode foil 2 is formed of an etching foil obtained by performing, for example, etching on a plate-shape metal foil, similarly to the anode foil 1. The anode foil 1 and the cathode foil 2 are connected to the lead wires 4 and 5, respectively. The capacitor element 10 is formed by winding the anode foil 1 and the cathode foil 2 as described above such that the separators 3 are interposed between the foils. Note that the formed capacitor element 10 may be immersed in a repair liquid to undergo a repair chemical conversion. The immersion time is preferably 5 to 20 minutes.

(2) Step of Forming a Solid Electrolyte Layer on the Capacitor Element

A solid electrolyte layer 7 is formed by immersing the capacitor element 10 in a conductive polymer dispersion and then drying the capacitor element. A time which the capacitor element 10 is immersed in the conductive polymer dispersion is determined depending on a size of the capacitor element 10, and it is desirable to have 5 seconds or longer for a capacitor element having a size of about 5 mm in diameter×3 mm in height, 10 seconds or longer for a capacitor element having a size of about 9 mm in diameter×5 mm in height, and the capacitor element needs to be immersed for at least 5 seconds. Note that long-time immersion has no adverse effect on the characteristics. In addition, after the above-described immersion, it is preferable to maintain the capacitor element in a reduced pressure state. The reason for this is considered to be because a residual amount of a volatile solvent is small. Immersion in the conductive polymer dispersion and drying may be performed multiple times if necessary.

After the capacitor element is immersed in the conductive polymer dispersion, the capacitor element 10 is dried at a predetermined temperature. The drying temperature is preferably 100 to 160° C., and the drying time is preferably 0.5 to 3 hours. By going through the drying step, the solid electrolyte layer containing a conductive polymer is formed on the capacitor element 10, specifically on dielectric films of etching pits of the etching foils.

(3) Step of Filling an Electrolyte Solution in a Void Part of the Capacitor Element The capacitor element 10 which the solid electrolyte layer 7 is formed on is immersed in the electrolyte solution to fill the electrolyte solution in the void part of the capacitor element 10.

(4) Step of Forming a Solid Electrolytic Capacitor

The capacitor element 10 is inserted into an outer case along with the electrolyte solution, and the case is sealed by attaching sealing rubber to an opening end portion by a caulking process. Then, aging is performed, and a solid electrolytic capacitor is produced. In addition, other than the outer case, the exterior of the capacitor element 10 may be covered with an insulating resin such as an epoxy resin, and aging may be performed, manufacturing the solid electrolytic capacitor.

[3. Effect]

(1) The solid electrolytic capacitor of the present embodiment has the capacitor element 10 obtained by winding the anode foil 1 and the cathode foil 2 with the separators 3 interposed therebetween, the capacitor element 10 has the solid electrolyte layer, the void part of the capacitor element 10 is filled with the electrolyte solution, the electrolyte solution contains the ammonium salt of the aliphatic carboxylic acid as a solute and a polyhydric alcohol as a solvent, and an addition amount of the acid serving as the solute relative to the solvent is 0.6 mol/kg or less.

As described above, the electrolyte solution contains the ammonium salt of the aliphatic carboxylic acid as a solute and the polyhydric alcohol as a solvent. When the ammonium salt of the aliphatic carboxylic acid is used as a solute, the voltage withstanding characteristic at a high voltage of 80 WV or more can be improved. In addition, by setting the addition amount of the acid serving as the solute relative to the solvent to 0.6 mol/kg or less, a change in an electrostatic capacity and ESR at a high voltage of 80 WV or more can be suppressed.

It has been found that, when a solvent containing the polyhydric alcohol such as ethylene glycol is used, initial ESR further decreases and a change rate of an electrostatic capacity ($\Delta$Cap) in long-term use is small in comparison to a case a solvent which does not containing ethylene glycol is used. The reason for this is considered to be because a polyhydric alcohol such as ethylene glycol has an effect of promoting extension of a polymer chain of a conductive polymer, improving conductivity and decreasing ESR.

In particular, in the electrolyte solution using the ammonium salt of the aliphatic carboxylic acid as a solute and a polyhydric alcohol such as ethylene glycol as a solvent, esters of the polyhydric alcohol and the carboxylic acid are produced by an esterification reaction that occurs in the electrolyte solution when the solid electrolytic capacitor is placed in a thermal atmosphere. In an amine salt or the like, such an esterification reaction causes aminium ions to lose protons and the ions are gasified, however, since a boiling point thereof is high, the salt remains inside a capacitor case, and as a result, pH of the electrolyte solution excessively changes and degradation of the conductive polymer easily occurs. However, as for the ammonium salt of the aliphatic carboxylic acid used as the solute in this invention, ammonium ions lose protons in an esterification reaction, and the ions are gasified and evaporated, and therefore it is considered that an excessive change hardly occurs in pH of the electrolyte solution when the capacitor is placed in a thermal atmosphere and degradation of the conductive polymer diminishes.

In addition, as a result of evaluation of various kinds of solutes, the ammonium salt of the aliphatic carboxylic acid is considered to have an excellent affinity with the conductive polymer in addition to the contribution to improvement of the chemical conversion property of the electrolyte solution, and to seldom cause the solid electrolyte layer to deteriorate in a high temperature resistance test, and thus deterioration of the solid electrolyte layer is considered to be suppressed as a concentration of the solute decreases. As described above, according to the present embodiment, it is possible to provide the solid electrolytic capacitor which exhibits excellent characteristics for high voltage applications at 80 WV or more and the method for manufacturing the same.

(2) The polyhydric alcohol may be ethylene glycol.

Aprotic solvent having a hydroxyl group such as ethylene glycol has affinity with separators, electrode foils, and conductive polymers higher than $\gamma$-butyrolactone or sulfolane. For this reason, it is considered that transfer of electric charges between the separators, the electrode foils, and the conductive polymer and the electrolyte solution can be easily performed in the course of volatilization of the electrolyte solution during use of the solid electrolytic capacitor, and a change rate of an electrostatic capacity ($\Delta$Cap) decreases.

(3) The electrolyte solution may be a non-aqueous electrolyte solution which does not contain water as a solvent.

When a water-based electrolyte solution containing water as a solvent is used, there is concern that the electrode foils or the conductive polymer contained in the solid electrolyte layer deteriorates, and increasing ESR. Since the non-aqueous electrolyte solution which does not contain water as a solvent is used in the present embodiment, an increase in ESR can be suppressed more than when a water-based electrolyte solution is used.

(4) The electrolyte solution may further contain boric acid and mannitol.

By adding boric acid and mannitol to the electrolyte solution, a change in an electrostatic capacity or ESR in tolerance tests can be further suppressed.

(5) A molecular weight of the aliphatic carboxylic acid may be 150 or more.

By using the aliphatic carboxylic acid having a molecular weight of 150 or more, the voltage withstanding characteristic at a high voltage exceeding 80 WV can be further improved.

EXAMPLES

The invention will be described in more detail based on examples below. It should be noted that the invention is not limited to the examples which will be described below.

(1) Voltage Withstanding Tests of the Solid Electrolytic Capacitor (at a Rated Voltage of 80 WV)

First, solid electrolytic capacitors as described below were produced in order to perform voltage withstanding tests of the solid electrolytic capacitors at a rated voltage of 80 WV.

<Production of a Solid Electrolytic Capacitor of Example 1>

Lead wires, which are electrode leading-out means, were connected to an anode foil and a cathode foil each having a dielectric film layer on surface thereof, and the electrode foils were wound with manila-based separators interposed therebetween to form a capacitor element having an element shape of a size of 8 mm in diameter×10 mm in height. Then, the capacitor element was immersed in an ammonium dihydrogenphosphate aqueous solution for 40 minutes for a repair chemical conversion.

Then, a conductive polymer dispersion which particles of PEDOT, and polystyrene sulfonate were dispersed in an aqueous solution was produced. The capacitor element was immersed in the conductive polymer dispersion, and then the capacitor element was put out and dried at 150° C. for 30 minutes. The immersion in the conductive polymer dispersion and drying of the capacitor element were performed multiple times, and a solid electrolyte layer composed of a conductive polymer was formed on the capacitor element.

Next, ammonium azelate was added to ethylene glycol to produce an electrolyte solution. An addition amount of the ammonium azelate was 0.09 mol/kg of azelaic acid and 0.09 mol/kg of ammonium ions with respect to the solvent. In addition, as additives, a total of 2 wt % of ester phosphate and a p-nitrobenzoic acid were added to the electrolyte solution. After the capacitor element was immersed in the produced electrolyte solution, the capacitor element was inserted into a bottomed cylindrical outer case, sealing rubber was attached to an opening end portion of the case, and the case was sealed in a caulking process. Then, aging was performed by applying a voltage thereto, and a solid electrolytic capacitor was formed. Note that a rated capacity of the solid electrolytic capacitor is 39 μF.

<Production of a Solid Electrolytic Capacitor of Example 2>

A solid electrolytic capacitor was produced similarly to in Example 1, except for an addition amount of ammonium azelate which was 0.26 mol/kg of the azelaic acid and 0.26 mol/kg of ammonium ions.

<Production of a Solid Electrolytic Capacitor of Example 3>

A solid electrolytic capacitor was produced similarly to in Example 1, except for an addition amount of ammonium azelate which was 0.37 mol/kg of the azelaic acid and 0.37 mol/kg of ammonium ions.

<Production of a Solid Electrolytic Capacitor of Example 4>

A solid electrolytic capacitor was produced similarly to in Example 1, except for an addition amount of ammonium azelate which was 0.60 mol/kg of the azelaic acid and 0.60 mol/kg of ammonium ions.

<Production of a Solid Electrolytic Capacitor of Example 5>

A solid electrolytic capacitor was produced similarly to in Example 1, except for an addition of a total of 2.8 wt % of ester phosphate, p-nitrobenzoic acid, boric acid, and mannitol to an electrolyte solution as additives.

<Production of a Solid Electrolytic Capacitor of Example 6>

Ammonium azelate was replaced with ammonium adipate. An addition amount of ammonium adipate was 0.06 mol/kg of adipic acid was 0.06 mol/kg and 0.06 mol/kg of ammonium ions. A solid electrolytic capacitor was produced with other processes being similar to Example 1.

<Production of a Solid Electrolytic Capacitor of Example 7>

A solid electrolytic capacitor was produced similarly to Example 6, except for an addition amount of ammonium adipate which was 0.10 mol/kg of adipic acid and 0.10 mol/kg of ammonium ions.

<Production of a Solid Electrolytic Capacitor of Example 8>

A solid electrolytic capacitor was produced similarly to Example 6, except for an addition amount of ammonium adipate which was 0.16 mol/kg of adipic acid and 0.16 mol/kg of ammonium ions.

<Production of a Solid Electrolytic Capacitor of Example 9>

A solid electrolytic capacitor was produced similarly to Example 6, except for an addition amount of ammonium adipate which was 0.20 mol/kg of adipic acid and 0.20 mol/kg of ammonium ions.

<Production of a Solid Electrolytic Capacitor of Example 10>

Ammonium azelate was replaced with a 1,6-decane dicarboxylic acid ammonium salt. An addition amount of the 1,6-decane dicarboxylic acid ammonium salt was 0.09 mol/kg of 1,6-decane dicarboxylic acid and 0.09 mol/kg of ammonium ions. A solid electrolytic capacitor was produced with other processes being similar to Example 1. Note that a rated capacity of the solid electrolytic capacitor is 22 μF.

<Production of a Solid Electrolytic Capacitor of Example 11>

Ammonium azelate was replaced with a 1,7-octane dicarboxylic acid ammonium salt, a 7-methyl-7-methoxycarbonyl-1,9-decane dicarboxylic acid ammonium salt, a 7,9-dimethyl-7,9-dimethoxycarbonyl-1,11-dodecane dicarboxylic acid ammonium salt, and a 7,8-dimethyl-7,8-dimethoxycarbonyl-1,14-tetradecane dicarboxylic acid ammonium salt. Addition amounts of the solutes were 0.05 mol/kg of 1,7-octane dicarboxylic acid, 0.01 mol/kg of 7-methyl-7-methoxycarbonyl-1,9-decane dicarboxylic acid, 0.01 mol/kg of 7,9-dimethyl-7,9-dimethoxycarbonyl-1,11-dodecane dicarboxylic acid, 0.02 mol/kg of 7,8-dimethyl-7,8-dimethoxycarbonyl-1,14-tetradecane dicarboxylic acid, and 0.09 mol/kg of ammonium ions. A solid electrolytic capacitor was produced with other processes being similar to Example 1. Note that a rated capacity of the solid electrolytic capacitor is 22 μF.

<Production of a Solid Electrolytic Capacitor of Comparative Example 1>

Ammonium azelate was replaced with triethylamine phthalate. An addition amount of triethylamine phthalate was 0.60 mol/kg of phthalic acid and 0.47 mol/kg of triethylamine. A solid electrolytic capacitor was produced with other processes being similar to Example 1.

<Production of a Solid Electrolytic Capacitor of Comparative Example 2>

Ammonium azelate was replaced with triethylamine azelate. An addition amount of triethylamine azelate was 0.60 mol/kg of azelaic acid and 0.47 mol/kg of triethylamine. A solid electrolytic capacitor was produced with other processes being similar to Example 1.

<Production of a Solid Electrolytic Capacitor of Comparative Example 3>

A solid electrolytic capacitor was produced similarly to Example 1, except for an addition amount of ammonium azelate which was 0.81 mol/kg of azelaic acid was and 0.81 mol/kg of ammonium ions.

Results obtained by applying voltages to the solid electrolytic capacitors produced as described above, and checking whether voltages is increased to film withstand voltages of dielectric films required for the solid electrolytic capacitors of 80 WV are shown in Table 1. In Table 1, the circle symbols indicate solid electrolytic capacitors having electrode foils which voltages are increased to the film withstand voltage. In addition, the cross symbol indicates a solid electrolytic capacitor having short-circuited electrode foils which a voltage was not increased to the film withstand voltage.

TABLE 1

| | Electrolyte | Addition amount (mol/kg) | Test result |
|---|---|---|---|
| Example 1 | Ethylene glycol | | ○ |
| | Azelaic acid | 0.09 | |
| | Ammonium ions | 0.09 | |
| Example 2 | Ethylene glycol | | ○ |
| | Azelaic acid | 0.26 | |
| | Ammonium ions | 0.26 | |
| Example 3 | Ethylene glycol | | ○ |
| | Azelaic acid | 0.37 | |
| | Ammonium ions | 0.37 | |

TABLE 1-continued

|  | Electrolyte | Addition amount (mol/kg) | Test result |
|---|---|---|---|
| Example 4 | Ethylene glycol |  | ○ |
|  | Azelaic acid | 0.60 |  |
|  | Ammonium ions | 0.60 |  |
| Example 5 | Ethylene glycol |  | ○ |
|  | Azelaic acid | 0.09 |  |
|  | Ammonium ions | 0.09 |  |
| Example 6 | Ethylene glycol |  | ○ |
|  | Adipic acid | 0.06 |  |
|  | Ammonium ions | 0.06 |  |
| Example 7 | Ethylene glycol |  | ○ |
|  | Adipic acid | 0.10 |  |
|  | Ammonium ions | 0.10 |  |
| Example 8 | Ethylene glycol |  | ○ |
|  | Adipic acid | 0.16 |  |
|  | Ammonium ions | 0.16 |  |
| Example 9 | Ethylene glycol |  | ○ |
|  | Adipic acid | 0.20 |  |
|  | Ammonium ions | 0.20 |  |
| Example 10 | Ethylene glycol |  | ○ |
|  | 1,6-Decane dicarboxylic acid | 0.09 |  |
|  | Ammonium ions | 0.09 |  |
| Example 11 | Ethylene glycol |  | ○ |
|  | 1,7-Octane dicarboxylic acid | 0.05 |  |
|  | 7-Methyl-7-methoxycarbonyl-1,9-decane dicarboxylic acid | 0.01 |  |
|  | 7,9-Dimethyl-7,9-dimethoxycarbonyl-1,11-dodecane dicarboxylic acid | 0.01 |  |
|  | 7,8-Dimethyl-7,8-dimethoxycarbonyl-1,14-tetradecane dicarboxylic acid | 0.02 |  |
|  | Ammonium ions | 0.09 |  |
| Comparative Example 1 | Ethylene glycol |  | X |
|  | Phthalic acid | 0.60 |  |
|  | Triethylamine | 0.47 |  |
| Comparative Example 2 | Ethylene glycol |  | ○ |
|  | Azelaic acid | 0.60 |  |
|  | Triethylamine | 0.47 |  |
| Comparative Example 3 | Ethylene glycol |  | ○ |
|  | Azelaic acid | 0.81 |  |
|  | Ammonium ions | 0.81 |  |

As is obvious from Table 1, in all of Examples 1 to 5 using azelaic acid, Examples 6 to 9 using adipic acid, Example 10 using 1,6-decane dicarboxylic acid, and Example 11 using a mixed solute of multiple aliphatic carboxylic acids, voltages are increased to film withstand voltages of the electrode foils. In addition, in Comparative Examples 2 and 3 using aliphatic carboxylic acids, voltages are increased to film withstand voltages of the electrode foils, as in Examples 1 to 11. However, in Comparative Example 1 using phthalic acid, which is an aromatic carboxylic acid, the electrode foils were short-circuited before increasing to voltage of the film withstand voltage.

(2) Voltage Withstanding Test of Solid Electrolytic Capacitors (at a Rated Voltage of 100 WV)

Next, solid electrolytic capacitors were further produced in order to perform voltage withstanding tests of the solid electrolytic capacitor at a rated voltage of 100 WV.

<Production of a Solid Electrolytic Capacitor of Example 12>

A solid electrolytic capacitor was produced similarly to Example 4, except that the rated capacity was changed to 18 μF.

<Production of a Solid Electrolytic Capacitor of Example 13>

Ammonium azelate was replaced with ammonium adipate. An addition amount of ammonium adipate was 0.60 mol/kg of adipic acid and 0.60 mol/kg of ammonium ions was. A solid electrolytic capacitor was produced with other processes being similar to Example 12.

Results obtained by applying voltages to the solid electrolytic capacitors produced as described above, and checking whether voltages is increased to film withstand voltages of dielectric films required for the solid electrolytic capacitors of 100 WV are shown in Table 2. In Table 2, the circle symbol indicates a solid electrolytic capacitor having an electrode foil which a voltage is increased to the film withstand voltage. In addition, the cross symbol indicates a solid electrolytic capacitor having a short-circuited electrode foil which a voltage was not increased to the film withstand voltage.

TABLE 2

|  | Electrolyte | Addition amount (mol/kg) | Test result |
|---|---|---|---|
| Example 12 | Ethylene glycol |  | ○ |
|  | Azelaic acid | 0.60 |  |
|  | Ammonium ions | 0.60 |  |
| Example 13 | Ethylene glycol |  | X |
|  | Adipic acid | 0.60 |  |
|  | Ammonium ions | 0.60 |  |

As is obvious from Table 2 for the voltage withstanding test for 100 WV, the voltage is increased to the film withstand voltage of the electrode foils in Example 12 in using azelaic acid. On the other hand, in Example 13 using adipic acid, the electrode foils were short-circuited before increasing to the voltage of the film withstand voltage. Although the solid electrolytic capacitors using adipic acid had voltages increased to the film withstand voltages in the voltage withstanding test for 80 WV, they short-circuited before increasing to the voltage of the voltage withstanding test for 100 WV. The reason for this is considered to be because a molecular weight of an adipic acid is 146.1. A molecular weight of an azelaic acid which had an excellent result even in the voltage withstanding test for 100 WV is 188.22. Therefore, it is ascertained that, as a molecular weight of an aliphatic carboxylic acid increases, the voltage withstanding characteristic of a solid electrolytic capacitor is improved. In particular, it is ascertained that the voltage withstanding characteristic is improved when a molecular weight is 150 or more.

(3) Initial Capacitor Characteristics and those after Tolerance Tests

Initial ESR and dielectric loss (tan δ) were measured for the solid electrolytic capacitors of the above-described Examples 1 to 11, and Comparative Examples 2 and 3. Note that dielectric loss indicates a value at 120 kHz (20° C.) and an ESR characteristic indicates a value at 100 kHz (20° C.). In addition, the capacity in Examples 1 to 9 and Comparative Example 2 and 3 was 39 μF, and the capacity in Examples 10 and 11 was 22 μF, as described above.

Furthermore, a high temperature tolerance test at 125° C. and a rated voltage of 80 WV are performed to each of the solid electrolytic capacitors, and a change rate of ESR (AESR) and a change rate of dielectric loss (Δ tan δ) after 500 hours and 1500 hours gave elapsed were calculated. Results obtained after 500 hours have elapsed are shown in Table 3.

TABLE 3

|  | Initial values | | Values at 125° C. after of 500 hours have elapsed | |
| --- | --- | --- | --- | --- |
|  | tanδ | ESR | Δtanδ | ΔESR |
| Example 1 | 0.024 | 0.021 | 0.21 | 0.33 |
| Example 2 | 0.019 | 0.022 | 0.32 | 0.45 |
| Example 3 | 0.017 | 0.022 | 0.41 | 0.50 |
| Example 4 | 0.014 | 0.022 | 0.57 | 0.59 |
| Example 5 | 0.030 | 0.020 | 0.00 | 0.20 |
| Example 6 | 0.028 | 0.022 | 0.21 | 0.27 |
| Example 7 | 0.027 | 0.022 | 0.22 | 0.27 |
| Example 8 | 0.024 | 0.022 | 0.25 | 0.27 |
| Example 9 | 0.023 | 0.022 | 0.22 | 0.27 |
| Example 10 | 0.016 | 0.022 | 0.13 | 0.32 |
| Example 11 | 0.017 | 0.022 | 0.13 | 0.41 |
| Comparative Example 2 | 0.018 | 0.021 | 0.28 | 0.52 |
| Comparative Example 3 | 0.009 | 0.023 | 1.00 | 0.70 |

As is obvious from Table 3, among the results of the tolerance test with after 500 hours have elapsed, the change rates of ESR and dielectric loss had the lowest values in Example 5 which boric acid and mannitol were added. From Examples 1 to 4, it is ascertained that the change rates of ESR and dielectric loss increased as the addition amounts of the acids of the solutes increased. In addition, in Comparative Example 3 which 0.81 mol/kg of azelaic acid was added, the change rate of ESR was high. Meanwhile, in Examples 1 to 11 and Comparative Example 2 which the addition amounts of the acids of the solutes were 0.6 mol/kg or less, the change rate of ESR was lower than in Comparative Example 3.

Next, results with the elapse of 1500 hours are shown in Table 4.

TABLE 4

|  | Initial values | | Values at 125° C. after the elapse of 1500 hours | |
| --- | --- | --- | --- | --- |
|  | tanδ | ESR | Δtanδ | ΔESR |
| Example 1 | 0.024 | 0.021 | 0.21 | 0.62 |
| Example 2 | 0.019 | 0.022 | 0.37 | 0.86 |
| Example 3 | 0.017 | 0.022 | 0.65 | 0.95 |
| Example 4 | 0.014 | 0.022 | 0.86 | 1.14 |
| Example 5 | 0.030 | 0.020 | 0.07 | 0.40 |
| Example 6 | 0.028 | 0.022 | 0.29 | 0.59 |
| Example 7 | 0.027 | 0.022 | 0.30 | 0.64 |
| Example 8 | 0.024 | 0.022 | 0.33 | 0.82 |
| Example 9 | 0.023 | 0.022 | 0.35 | 0.86 |
| Comparative Example 2 | 0.018 | 0.021 | 1.11 | 2.10 |
| Comparative Example 3 | 0.009 | 0.023 | 1.56 | 1.30 |

As is obvious from Table 4, among the results of the tolerance test with after 1500 hours have elapsed, the change rates of ESR and dielectric loss also had the lowest values in Example 5 which a boric acid and mannitol were added, in comparison to other examples and comparative examples. Furthermore, from Examples 1 to 4, it is ascertained that the change rates of ESR and dielectric loss increased as the addition amounts of the acids of the solutes increased. In addition, in Comparative Example 2 which the trimethylamine salt was used instead of using an ammonium salt of an aliphatic carboxylic acid, the change rate of ESR and dielectric loss remarkably increased. On the other hand, in Examples 1 to 9 which ammonium salts of the aliphatic carboxylic acid were used, the change rate of ESR and dielectric loss were values smaller than those of Comparative Example 2.

In addition, in Comparative Example 3 which 0.81 mol/kg of azelaic acid was added, not only the change rate of dielectric loss but also the change rate of ESR showed results of high values. On the other hand, in Examples 1 to 9 which the ammonium salts of the aliphatic carboxylic acid were added and the addition amounts of the acid serving as the solute were 0.6 mol/kg or less, the change rates of ESR and dielectric loss were values smaller than in Comparative Example 3.

REFERENCE SIGNS LIST

1 Anode foil
2 Cathode foil
3 Separator
4, 5 Lead wire
10 Capacitor element

The invention claimed is:

1. A solid electrolytic capacitor comprising:
   a capacitor element obtained by winding an anode foil and a cathode foil with a separator interposed therebetween,
   wherein the capacitor element has a solid electrolyte layer;
   the capacitor element is filled with an electrolyte solution;
   the electrolyte solution contains an ammonium salt of an aliphatic carboxylic acid as a solute and a polyhydric alcohol as a solvent and is a non-aqueous electrolyte solution; and
   an addition amount of an acid serving as the solute relative to the solvent is 0.6 mol/kg or less.

2. The solid electrolytic capacitor according to claim 1, wherein the polyhydric alcohol is ethylene glycol.

3. The solid electrolytic capacitor according to claim 2, wherein the electrolyte solution further contains boric acid and mannitol.

4. The solid electrolytic capacitor according to claim 2, wherein a molecular weight of the aliphatic carboxylic acid is 150 or more.

5. The solid electrolytic capacitor according to claim 4, wherein the electrolyte solution further contains boric acid and mannitol.

6. The solid electrolytic capacitor according to claim 1, wherein the electrolyte solution further contains boric acid and mannitol.

7. The solid electrolytic capacitor according to claim 1, wherein a molecular weight of the aliphatic carboxylic acid is 150 or more.

8. The solid electrolytic capacitor according to claim 1, wherein the moisture contained therein is 3% by weight or less.

9. A method for manufacturing a solid electrolytic capacitor, comprising:
   a step of forming a capacitor element obtained by winding an anode foil and a cathode foil with a separator interposed therebetween,
   a step of forming a solid electrolyte layer by immersing the capacitor element in a dispersion of a conductive polymer, and then drying the capacitor element, and
   a step of filling an electrolyte solution into the capacitor element by immersing the capacitor element having the solid electrolyte layer in the electrolyte solution, wherein the electrolyte solution contains an ammonium salt of an aliphatic carboxylic acid as a solute and a polyhydric alcohol as a solvent and is a non-aqueous electrolyte solution, and wherein an addition amount of an acid serving as the solute relative to the solvent is 0.6 mol/kg or less.

* * * * *